(12) United States Patent
Crater

(10) Patent No.: US 12,031,672 B1
(45) Date of Patent: Jul. 9, 2024

(54) FLUID DRAINING SYSTEM

(71) Applicant: Bruce Crater, Amargosa Valley, NV (US)

(72) Inventor: Bruce Crater, Amargosa Valley, NV (US)

( * ) Notice: Subject to any disclaimer, the term of this patent is extended or adjusted under 35 U.S.C. 154(b) by 0 days.

(21) Appl. No.: 17/708,497

(22) Filed: Mar. 30, 2022

Related U.S. Application Data

(63) Continuation-in-part of application No. 16/900,605, filed on Jun. 12, 2020, now abandoned.

(60) Provisional application No. 62/921,420, filed on Jun. 17, 2019.

(51) Int. Cl.
| | | |
|---|---|---|
| *F16N 31/00* | (2006.01) | |
| *B25B 27/00* | (2006.01) | |
| *B67C 11/02* | (2006.01) | |
| *F01M 11/04* | (2006.01) | |

(52) U.S. Cl.
CPC ........ *F16N 31/002* (2013.01); *B25B 27/0042* (2013.01); *B67C 11/02* (2013.01); *F01M 11/0408* (2013.01); *B67C 2011/025* (2013.01)

(58) Field of Classification Search
CPC .............. F16N 31/002; F01M 11/0408; B25B 27/0042; B67C 2011/025
See application file for complete search history.

(56) References Cited

U.S. PATENT DOCUMENTS

| | | | | |
|---|---|---|---|---|
| 1,582,758 A | * | 4/1926 | Jones ................. | F01M 11/0408 141/331 |
| 2,144,923 A | * | 1/1939 | Kester ..................... | B67C 11/02 141/334 |
| 2,510,414 A | * | 6/1950 | Philbrick ................ | F16D 3/185 403/182 |
| 3,973,549 A | | 8/1976 | Drummond | |
| 4,592,448 A | * | 6/1986 | Morris ............... | F01M 11/0408 141/98 |
| 4,695,088 A | | 9/1987 | Jensen | |
| 4,697,670 A | | 10/1987 | Arruda | |
| 4,800,933 A | | 1/1989 | Moore et al. | |
| 4,881,650 A | | 11/1989 | Bartz | |
| 5,121,776 A | | 6/1992 | Kovach | |

(Continued)

FOREIGN PATENT DOCUMENTS

| | | |
|---|---|---|
| RU | 2539226 | 1/2015 |
| RU | 2706301 | 11/2019 |
| RU | 2717459 | 3/2020 |

*Primary Examiner* — Minh Truong

(74) *Attorney, Agent, or Firm* — John Rizvi; John Rizvi, P.A.—The Patent Professor®

(57) ABSTRACT

A fluid draining system, for serving as an aid in emptying waste oil or other fluid from a fluid container to a fluid collection container, includes a main body, which may be made of injection molded plastic and may be at least partially transparent. The main body may have an opening for entrance of fluid from the fluid container, and a lower downward sloping chute for the exiting of the fluid towards the fluid collection container. A sleeve with one or more elastic seals may be provided at the main body to fluid-tightly yet operatively accommodate a socket extension or other tool for operating a drain plug of the fluid container. The fluid draining system may provide a unique hands free, confined fluid flow channel through which fluid will flow while draining from the fluid container, such as from an engine oil pan, crankcase, or transmission sump.

19 Claims, 10 Drawing Sheets

(56) References Cited

U.S. PATENT DOCUMENTS

| | | | | |
|---|---|---|---|---|
| 5,168,908 A | * | 12/1992 | Boyum | B67C 11/02 |
| | | | | 141/331 |
| 5,375,862 A | | 12/1994 | Sirianno | |
| 5,377,728 A | * | 1/1995 | McLeighton | B67C 11/02 |
| | | | | 210/477 |
| 5,960,907 A | | 10/1999 | Chau | |
| 9,820,618 B1 | * | 11/2017 | Fiedler | A47J 47/16 |
| 2015/0122822 A1 | | 5/2015 | Saffelle et al. | |
| 2020/0338704 A1 | * | 10/2020 | Merrill | B25B 27/0042 |

* cited by examiner

FLUID DRAINING SYSTEM

CROSS-REFERENCE TO RELATED APPLICATIONS

This application is a Continuation-In-Part of U.S. patent application Ser. No. 16/900,605, filed on Jun. 12, 2020, which in turn claims the benefit of Provisional Patent Application No. 62/921,420, filed on Jun. 17, 2019, both of which are incorporated by reference herein in their entirety.

FIELD OF THE INVENTION

The present invention relates generally to a device for the removal or draining of fluid from a fluid container. More specifically, the invention relates to a fluid draining system facilitating operation of a closure of the fluid container by a socket extension bar or other applicable tool, which fluid-tightly yet operatively extends through the fluid draining system, to remove the closure and expose a drain opening to initiate the fluid draining process.

BACKGROUND OF THE INVENTION

In the process of removing fluid from a container, such as oil from an internal combustion engine, an operator's hands or gloves usually are contaminated by fluid spillage when removing the drain plug. Garage mechanics normally use a large basin to catch the fluid, and simply rely on moving their hand away quickly when the fluid begins to pour out. By doing so oil is frequently splashed on the mechanics' clothes and the surrounding floor. The prior art includes a number of attempts to solve this problem.

A device is described in U.S. Pat. No. 4,230,002 by Skidmore, in the shape of a funnel having the small end attached to a drain hose, and a socket mount supported coaxially by a cross bar attached to and extended over the large funnel end. The small funnel opening has a hex drive, allowing an operator to rotate the funnel, with an open end box wrench for turning a socket applied to the socket mount for removal of a drain plug. The process is complicated by the fact that the funnel and tube need to be rotated, necessitating guiding the funnel with one hand, while the other performs the task of engaging and disengaging the open faced box wrench on the hex nut type of drive.

A similar device is disclosed in U.S. Pat. No. 4,800,933 by Moore, et al. It requires first loosening the drain plug, and then applying the funnel with the socket drive, which constitutes a two-step process.

In U.S. Pat. No. 4,485,853 by Gunderson, a device is described in the form of a rigid rim, with a plastic sheet attached, forming a container. An operator can grab a drain plug by inserting the hand from the bottom of the rim, the plastic sheet providing a barrier between the hand and the drain plug and subsequent fluid. This, again, is a two-step process involving first loosening the drain plug, and then manually rotating the drain plug out by hand.

U.S. Pat. No. 4,714,138 by Zaccone is an attempt to provide a tool with a wrench extension fed through a collection housing. As designed, the extension socket occupies a large portion of the housing opening. Because of this, there is little space for draining fluid to go. A sealed joint to the fluid reservoir is provided, but since a level, clean surface is not always available, a sealed joint requirement is a problem area. Also, the wrench cannot be easily used with the collection housing in the vertical position, since the wrench extension is then in line with a tube (72). The tube (72) apparently provides guidance for a relatively short fluid exit conduit (70) and serves as a fluid drain. A disadvantage of this device is that it is complex in structure.

U.S. Pat. No. 4,756,349 by Atkins, and U.S. Pat. No. 4,386,639 by Gable, et al., both describe devices that require the normal drain plugs to be replaced with special valve apparatus that connects to a fluid collection container. These devices are relatively complex, and cannot be used to drain fluid from a container, until the container drain plug is replaced with the special valve apparatus. Such a device, for example, would not be useful in a service station environment where most vehicles would not be equipped with the valve.

U.S. Pat. No. 5,852,961 by Kotouski, a device is described in the form of a funnel with an attached socket extension bar. The large funnel configuration combined with the weight thereof increases the difficulty with manipulation during the oil draining process. As indicated the device may be suspended from the above reservoir by the use of straps. Suspension by straps may require hooks or additional straps to attach to. Therefore the use of straps could cause space between the top of the device and the above reservoir creating a possible exit for splash of the oil being drained.

Accordingly, there is an established need for a solution to at least one of the aforementioned problems. For example, there is a need for an improved, simple, and effective tool for the safe and sanitary removal of waste fluids.

SUMMARY OF THE INVENTION

The present invention is directed to a fluid draining system, for serving as an aid in emptying waste oil or other fluid from a fluid container such as, but not limited to, an engine oil pan, crankcase, or transmission sump, to a fluid collection container or reservoir. The fluid draining system includes a main body, which may be made of injection molded plastic and may be at least partially transparent. The main body may have an opening for entrance of fluid from the fluid container, and a lower downward sloping chute for the exiting of the fluid towards the fluid collection container. A sleeve with one or more elastic seals may be provided at the main body to fluid-tightly yet operatively accommodate a socket extension or other tool for operating a drain plug of the fluid container. The fluid draining system may provide a useful, convenient, cost effective, rugged tool for the removal of fluid, such as a hazardous fluid, from a container. Furthermore, the invention is readily producible, and easy to operate: for example, the invention may be operable by a manual ratchet wrench.

In a first implementation of the invention, a fluid draining system may include a main body, which may comprise one or more walls enclosing an interior space. The main body may further include a fluid entrance opening communicated with the interior space, and a chute extending from and in fluid communication with the interior space. The chute may be oriented to direct fluid flow out of the main body to an open end of the chute by gravity. The fluid draining system may be additionally provided with a tool connector assembly carried by the main body. The tool connector assembly may include a sleeve, elongately formed along a first direction. A bore may be elongately formed through the sleeve and through the main body along the first direction. Opposite first and second ends of the bore may be located at the interior space of the main body and at an outside of the main body, respectively. The tool connector assembly may further include at least one elastic seal mounted at the bore and configured to elastically seal against an elongated element extending through the bore and to block fluid communication between the first end and the second end of the bore. Additionally, the tool connector assembly may include an elastic seal retainer, blocking a movement of the elastic seal relative to the bore along the first direction.

In a second aspect, the main body may be formed into a single-piece unit.

In another aspect, the sleeve may be integrally-formed with the main body into the single-piece unit.

In another aspect, the main body may be at least partially transparent such that an observer at the second end of the bore is able to view an area adjacent to the fluid entrance opening of the main body through the main body.

In another aspect, the first end of the bore may be arranged at a bottom wall of the one or more walls of the main body, the bottom wall arranged facing and below the interior space of the main body.

In yet another aspect, the chute may be located at a bottom area of the one or more walls of the main body.

In another aspect, the chute may include a bottom wall providing a top surface for fluid to flow thereon along the chute. The chute may be oriented laterally relative to a vertical, top-to-bottom direction of the main body. The top surface of the bottom wall of the chute may be sloped downward.

In another aspect, the chute may be communicated with the interior space through a chute opening formed in the main body.

In another aspect, the chute opening may be formed between a portion of the one or more walls located above the chute opening and the bottom wall of the main body.

In yet another aspect, the fluid entrance opening may be located at a top area of the main body and oriented upward.

In another aspect, the first direction may be parallel to a vertical, top-to-bottom direction of the main body.

In another aspect, the elastic seal retainer may include an annular body configured to elastically abut against an inner wall facing the bore to retain the elastic seal retainer in place relative to the inner wall and the bore.

In another aspect, the annular body of the elastic seal retainer may include a plurality of radially outwardly extending fingers. The radially outwardly extending fingers may be elastically deformable and configured to elastically abut against the inner wall to retain the elastic seal retainer in place relative to the inner wall and the bore.

In yet another aspect, the fluid draining system may further include a tool retainer. The tool retainer may include an annular body mountable about and frictionally securable to the elongated element receivable through the bore to at least partially block a longitudinal movement of the elongated element through the bore.

In another aspect, the annular body of the tool retainer may include a plurality of radially inwardly extending fingers. The radially inwardly extending fingers may be elastically deformable and configured to elastically adjust against the elongated element receivable through the bore.

In another aspect, the main body may further include one or more upwardly oriented slots. Each slot may include a respective bottom, open end. The slot or slots may be configured to fit and stabilize the main body on an external wall structure.

In another aspect, the one or more slots may be arranged between the open end of the chute and the tool connector assembly when the main body is observed in side elevation view.

In yet another aspect, the fluid draining system may further include a socket extension. The socket extension may be mountable to a position in which the socket extension extends through the bore of the tool connector assembly, and a first end of the socket extension is arranged outside the main body while an opposite, second end of the socket extension is arranged at or near the fluid entrance opening of the main body. A shaft of the socket extension and the at least one elastic seal may be shaped and sized relative to one another such that the at least one elastic seal elastically abuts against the shaft of the socket extension blocking fluid communication between the first end and the second end of the bore, while enabling the socket extension to rotate and axially move relative to the bore and the main body.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention is directed toward a tool for use in draining waste fluid from a first fluid reservoir or container, such as to a second fluid reservoir or container. Shown throughout the figures is a fluid draining system 100 in accordance with an illustrative embodiment of the invention.

Figure 1:
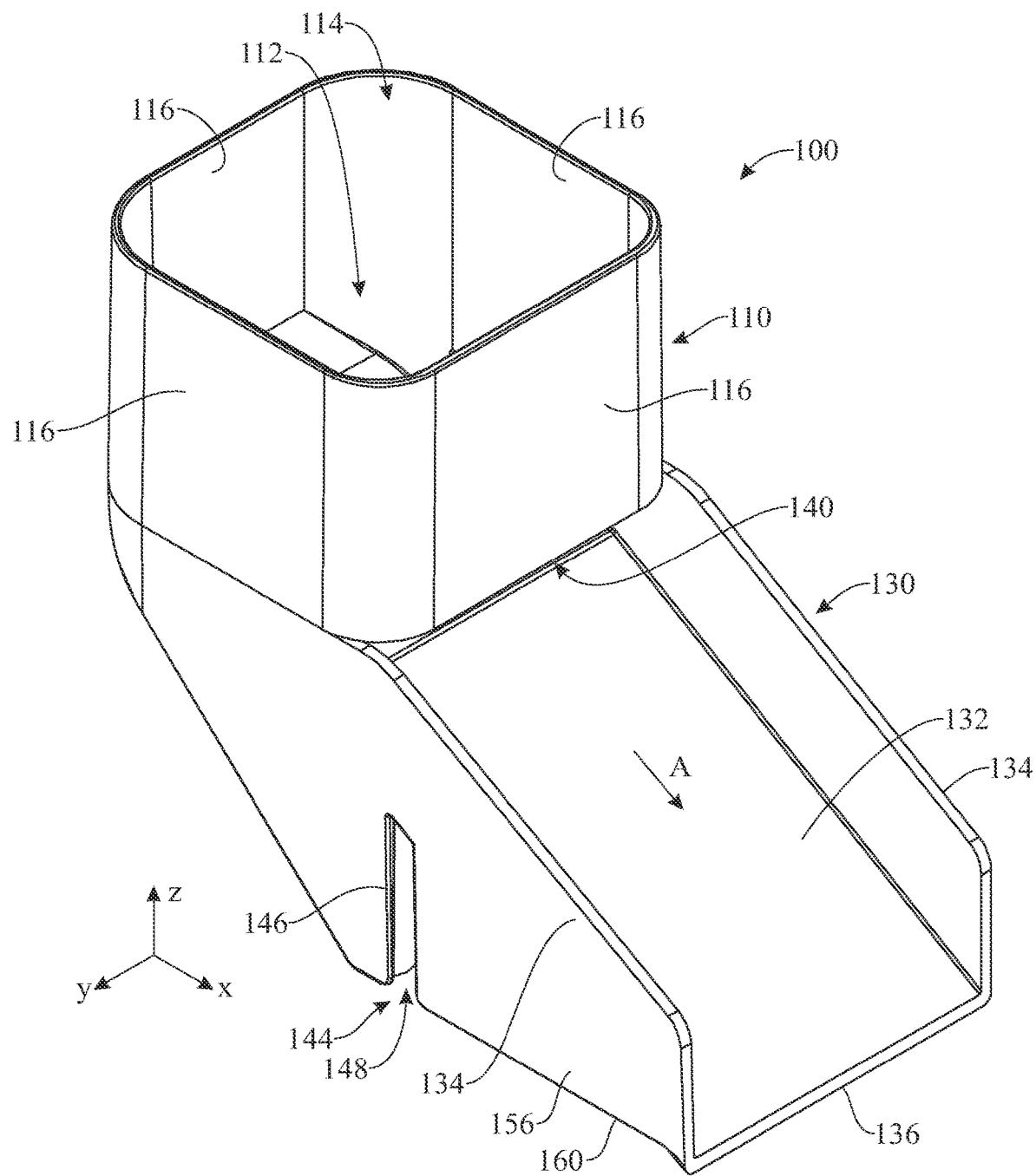
FIG. 1 presents a top, front isometric view of a main body of a fluid draining system in accordance with an illustrative embodiment of the present invention.
Figure 2:
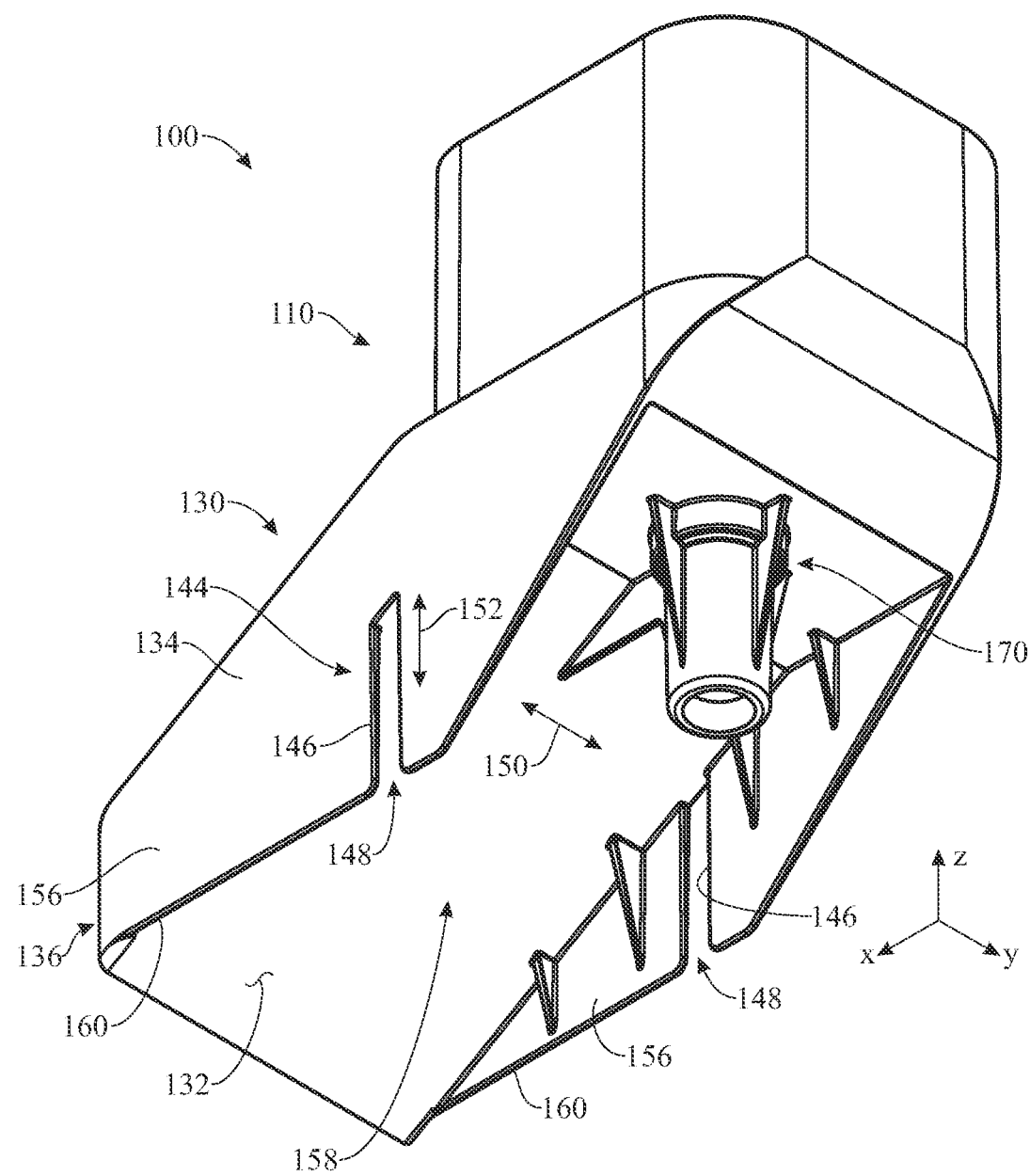
FIG. 2 presents a bottom, rear isometric view of the main body of FIG. 1.

Referring initially to FIGS. 1 and 2, the fluid draining system 100 may include a main body 110. The main body 110 of the fluid draining system may be manufactured from plastic materials or other synthetic or semi-synthetic polymers, such as, but not limited to, ABS resins, acetyl resins, nylon resins, urethane resins, or high impact polystyrene resins. In preferred embodiments, the main body may be manufactured by injection molding, and may thus be manufactured at relatively low cost. In preferred embodiments, the main body may be at least partially transparent, and more preferably, transparent substantially in its entirety, enabling the user to observe the removal and replacement of the drain plug and to control the volume and velocity of the oil as it is draining from the drain hole, as will be described in greater detail hereinafter. In other embodiments, the main body 110 may be manufactured from stamped or fabricated metals. Furthermore, embodiments are contemplated in which a combination of materials may be used.

Figure 4:
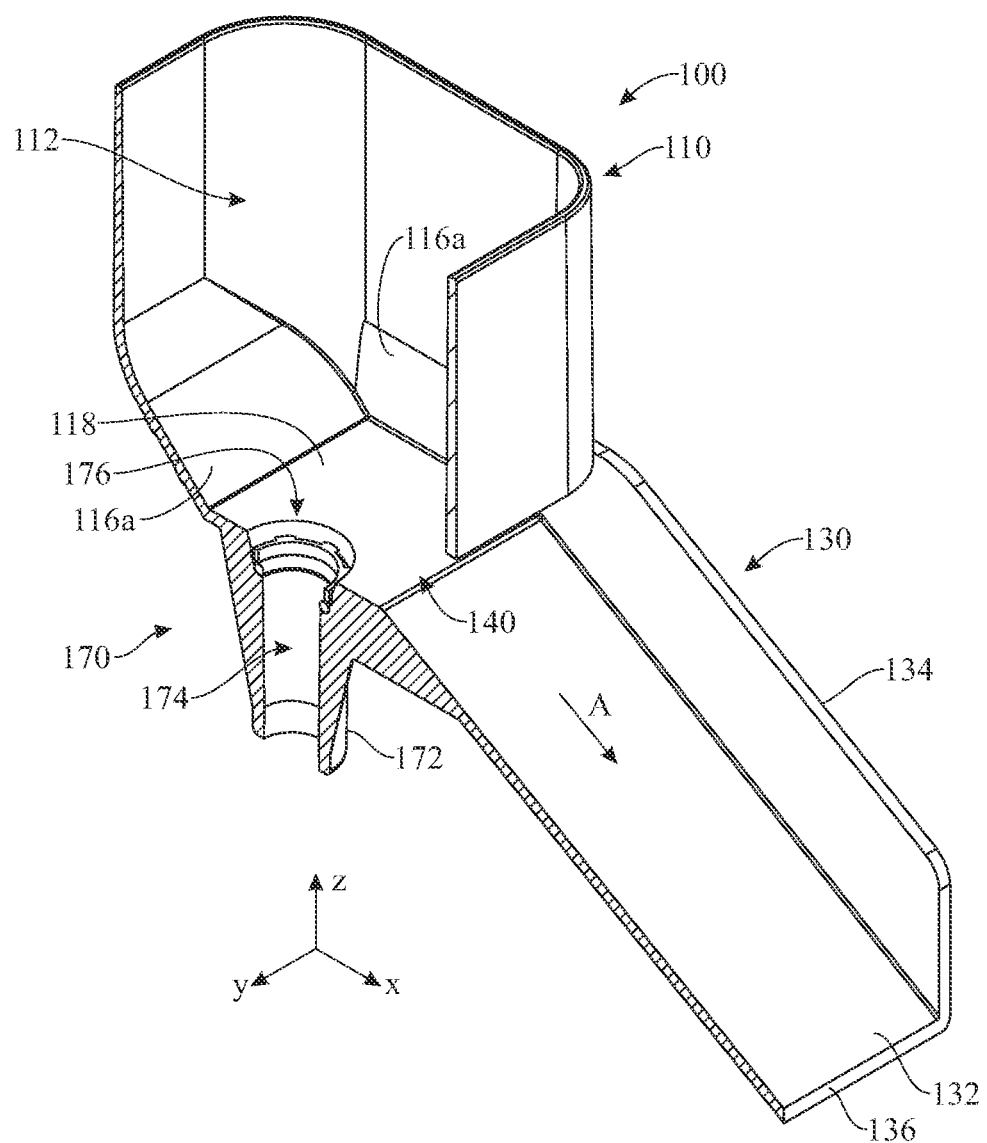
FIG. 4 presents a top front isometric, partial cutaway view of the main body of the fluid draining system of FIG. 1, revealing a tool connector assembly of the fluid draining system.
Figure 8:
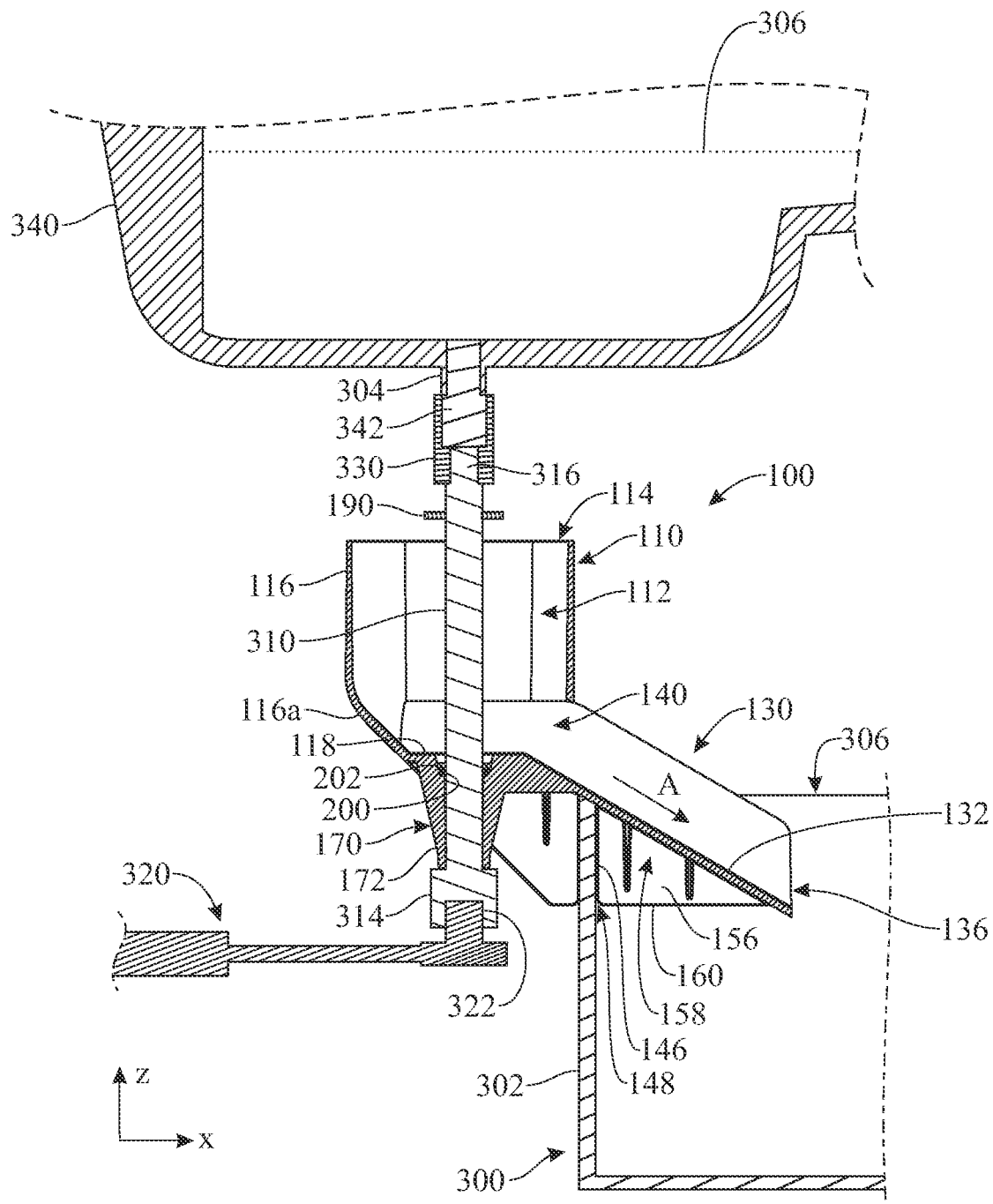
FIG. 8 presents a cross-sectional, side elevation view of the assembly of FIG. 7, taken along section plane 8-8.

The main body 110 defines an interior space 112 and a fluid entrance opening 114. The fluid entrance opening 114 is arranged in fluid communication with the interior space 112, and may be located at a top area of the main body 110. The interior space 112 may be defined, or formed by and between, one or more walls of the main body 110. For instance, in the depicted embodiment, the one or more walls defining the interior space 112 include four sidewalls 116 and a floor or bottom wall 118 extending from a bottom end of the four sidewalls 116, as best shown in FIGS. 4 and 8. The sidewalls 116 of the present embodiment are arranged in generally rectangular formation, are connected to one another at rounded corners, and extend along a generally vertical direction z. However, in other embodiments of the invention, the number of sidewalls and/or the sidewall arrangement may vary. For instance, in some embodiments, the sidewalls may be or include a single, cylindrical sidewall. In another example, the sidewall or sidewalls may be sloped or laterally oriented, such as with the fluid entrance opening 114 provided on a side of the main body 110. In preferred embodiments, the fluid entrance opening 114, whether it be located at a top of the main body 110 (as in the present embodiment), a lateral side of the main body, or other area of the main body, may be oriented upward (as shown for instance in FIG. 1), allowing fluid to fall through the fluid entrance opening 114 and into the main body 110 vertically downward, to increase speed of operation of the device.

As further shown in FIG. 1, the main body 110 may include one or more chutes 130 configured to direct fluid from the interior space 112 of the main body 110 towards a lower level with respect to the interior space 112. For instance, the main body 110 depicted herein specifically includes a single chute 130. The chute 130 comprises a bottom wall 132, which, as best shown in FIG. 4, may extend from the bottom wall 118 which faces the interior space 112. A top side of the bottom wall 132, and optionally an underside of the bottom wall 132, may be sloped downward and away from the interior space 112 in a direction A having a component in the vertical direction z and a component in a front-to-back, longitudinal direction x. The chute 130 may further include one or more lateral walls 134 arranged at, and extending from, one or more respective opposite sides of the bottom wall 132, configured to confine fluid falling along the top side of the bottom wall 132 transversely, such that fluid is directed forward and downward, as indicated by arrow A, towards a distal end 136 of the chute 130, and does not flow over the sides of the chute 130. A chute opening 140 may connect the interior space 112 of the main body 110 with the chute 130, i.e. with an area of the chute 130 located immediately over the bottom wall 132 and along which the fluid flows. As best shown in FIG. 8, in some embodiments, such as the present embodiment, the chute opening 140 may be formed between a sidewall 116 of the main body 110 and the bottom wall 132 of the chute 130. The chute opening 140 may span at least part of the width (dimension along a transverse direction y, perpendicular to the longitudinal direction x and the vertical direction z) of the chute 130 and at least part of the width of the bottom of the interior space 112 and the bottom wall 118. For example, in the present embodiment, the chute opening 140 spans along substantially the entire width of the chute 130 and substantially the entire width of the bottom of the interior space 112 and the bottom wall 118.

As further shown in FIG. 1, the chute 130 may be substantially equal in width to the bottom of the interior space 112 and the bottom wall 118, increasing the ability of the chute 130 to capture all fluid flow from the interior space 112. In some embodiments, such as the present embodiment, the chute 130 may in fact be substantially equal in width to the arrangement of sidewalls 116 and thus to the interior space 112 along its entire length (height, in accordance with the present embodiment and depicted orientation) between the bottom wall 118 and the fluid entrance opening 114. In some embodiments, the size and shape of the fluid entrance opening 114 may generally match those of the bottom wall 118 when observed in plan view (top plan view, in the present embodiment and depicted orientation). Such matching in shape and size may contribute to maximize the ability of the main body 110 to capture possible fluid splashes or non-vertical fluid flow and allow the capture fluid to directly flow towards the chute opening 140.

With reference to FIG. 2, the main body 110 may further include at least one mount 144 configured to secure the main body 110 to an external structure such that the main body 110 is stabilized and there is not a need to manually hold the main body 110 in place during use. For example, the at least one mount 144 may include one or more slots, hooks, clamps, or magnets, configured to receive a wall or other portion of a fluid collection container or other structure. In some embodiments, the at least one mount 144 may be more specifically configured to secure the main body 110 to a fluid collection structure or container, hereinafter referred to generally as fluid collection container, with the chute 130 oriented towards an opening of the fluid collection container such that fluid flowing downward along the chute 130 is directly fed into the fluid collection container while the at least one mount 144 secures the main body 110 in place relative to the fluid collection container.

Figure 10:
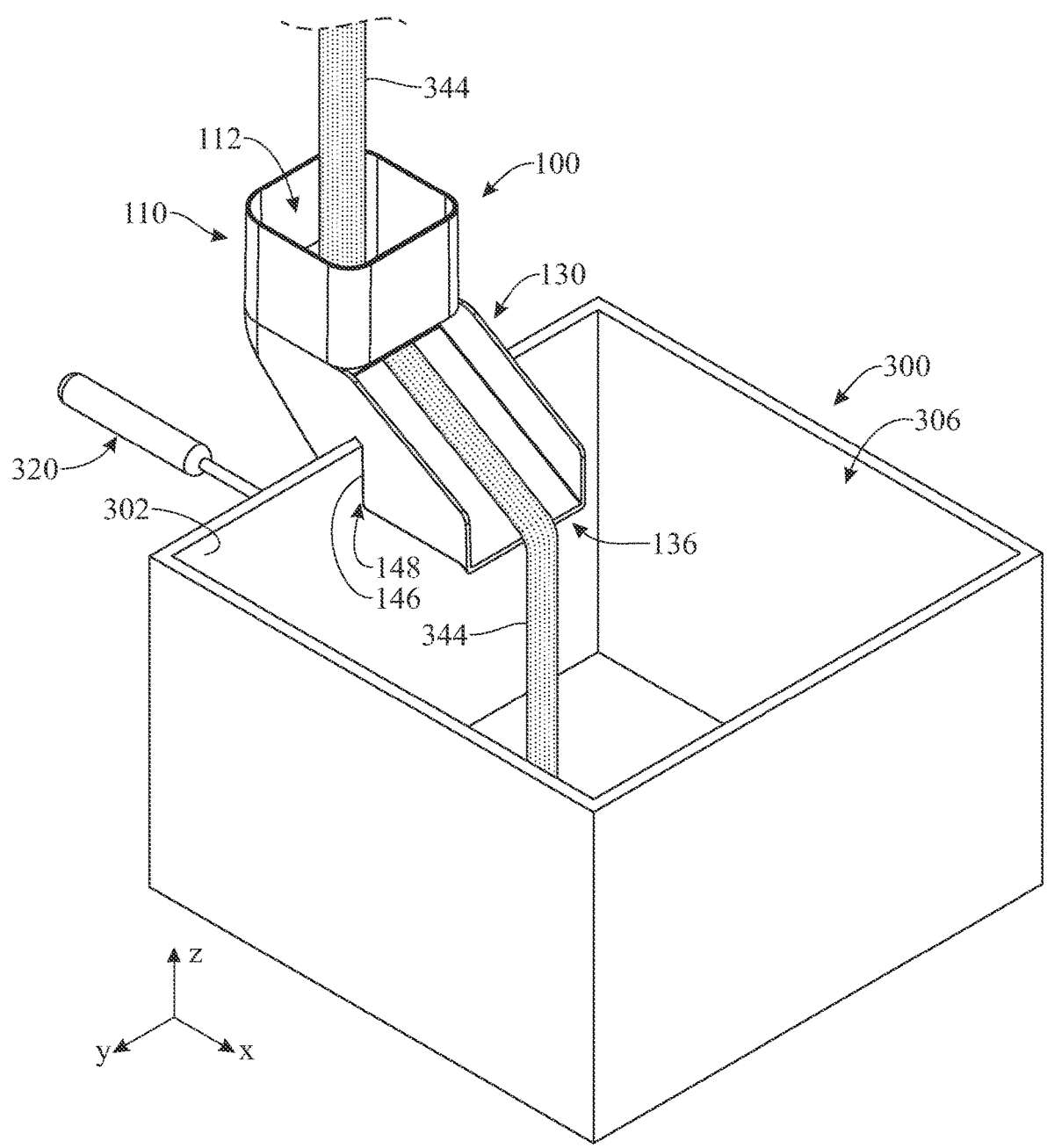
FIG. 10 presents a top, front isometric view of the fluid draining system and fluid collection container of FIG. 9, depicting fluid being drained into the main body of the fluid draining system through the fluid entrance opening, and being directed into the fluid collection container by a chute of the main body.

For example, in the present embodiment, as best shown in FIG. 2, the at least one mount 144 consists of two spaced apart slots 146 formed in the main body 110 and having open ends 148 configured to receive a wall of an external structure such as, but not limited to, a fluid collection container 300 (FIG. 10). The slots 146 are aligned in an alignment direction 150 and are elongately formed in a slot direction 152, such that when receiving the fluid collection container 300, the slots 146 prevent an oscillating of the main body 110 about a rotation axis parallel to the alignment direction 150. The alignment direction 150 may be arranged, for instance, in the transverse direction y. In turn, the slot direction 152 may have a vertical component, and more preferably, may be generally vertical, such that the main body 110 remains secured to the fluid collection container 300 by gravity. For instance, in the present embodiment, the slot direction 152 is arranged in the vertical direction z. In some embodiments, the slots 146 may be arranged generally between the interior space 112 and the distal end 136 of the chute 130, if the main body 110 is observed in side elevation view, allowing the slots 146 to position the distal end 136 of the chute 130 facing a fluid entrance opening 306 of the fluid collection container 300 (FIG. 10) while the interior space 112 and fluid entrance opening 114 of the main body 110 are arranged generally outside the fluid entrance opening 306.

It should be noted that having the mount include two spaced-apart slots 146 may allow the mount to attach to different structure configurations, such as, but not limited to, a flat straight sidewall 302 (FIG. 10) of a rectangular or square fluid collection container 300, a curved sidewall of a cylindrical or other curved container, etc. However, while the present embodiment specifically includes two spaced slots 146, the number of slots may vary in different embodiments of the invention. For example, the main body 110 may include three or more spaced-apart slots 146. Alternatively or additionally, the main body 110 may include a single slot which is elongated in the slot direction 152 and stably receives the wall portion of the fluid collection container 300 or other structure.

With continued reference to FIG. 2, the slots 146 of the present embodiment are formed in respective bottom wall portions 156 of the main body 110. The bottom wall portions 156 are arranged in spaced-apart relationship with one another, defining a space 158 therebetween. In some embodiments, the space 158 may be further defined by an underside of the chute 130, and more specifically, by an underside of the bottom wall 132 of the chute 130. In a non-limiting example, the bottom wall portions 156 may be provided as downward extensions of the lateral walls 134 of the chute 130, as shown. In some embodiments, bottom edges 160 of the wall portions 156 may be configured to stably rest on a horizontal surface, such as for storage purposes. Alternatively or additionally, the chute 130 may be configured to stably rest on a horizontal surface. For instance, as best shown in FIGS. 2 and 8, the bottom edges 160 of the wall portions 156 and the distal end 136 of the chute 130 are configured to jointly provide a stable contact plane with a horizontal surface.

Figure 3:
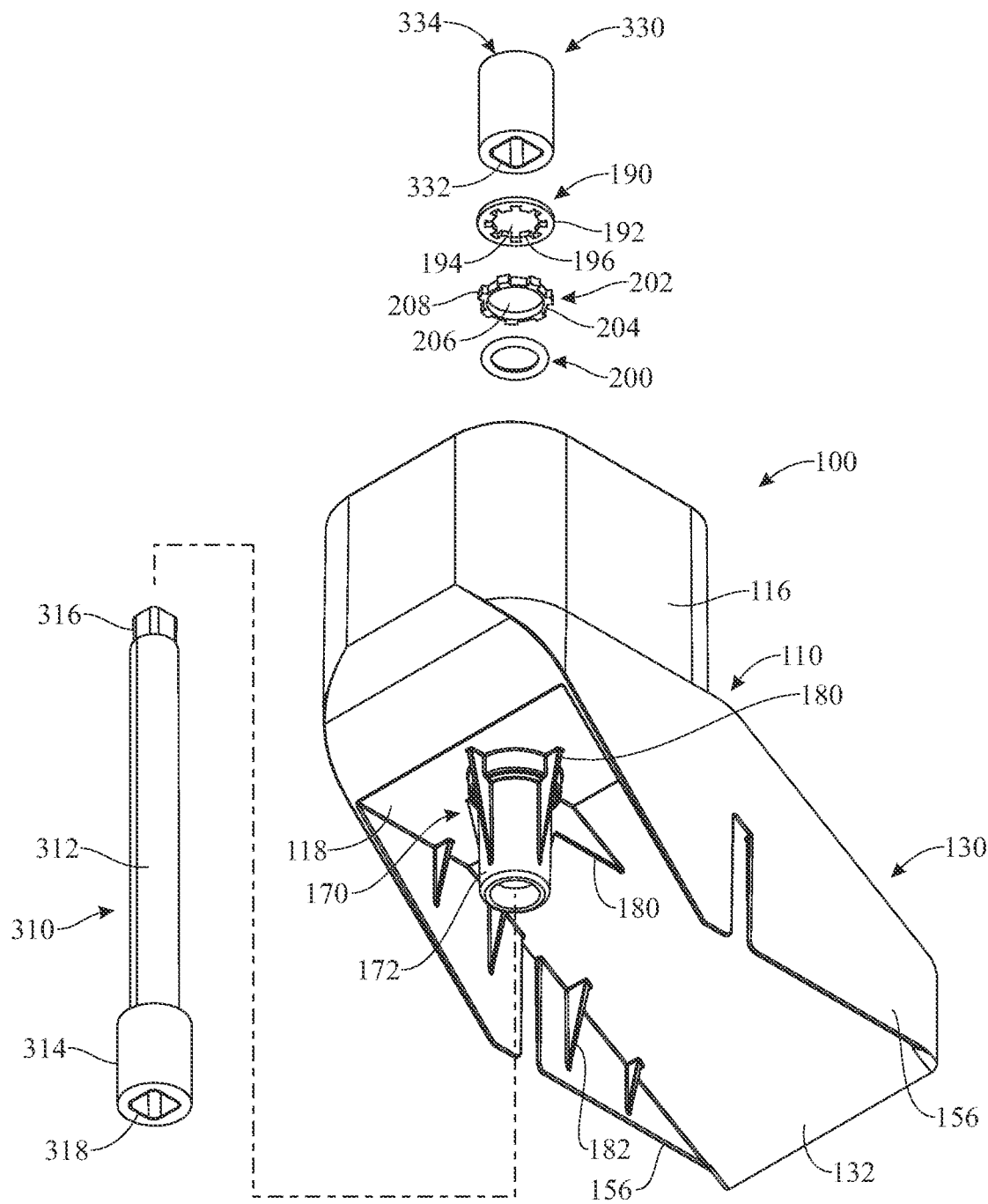
FIG. 3 presents an exploded bottom, rear isometric view of the fluid draining system, further illustrating a socket extension and a socket in accordance with one illustrative embodiment or application of the invention.

With reference now to FIGS. 3 and 4, the main body 110 of the fluid draining system 100 may further include a tool connector assembly 170, configured to sealingly receive a socket extension 310 or other operation tool (hereinafter referred to generally as socket extension 310) therethrough such that the socket extension 310 may be placed at or near the fluid entrance opening 114 while being operable from outside the main body 110, for purposes that will be described hereinafter. In different embodiments of the invention, the tool connector assembly 170 may be located on different sides or areas of the main body 110. For instance, the tool connector assembly 170 of the present embodiment is located on a bottom side of the interior space 112, at the bottom wall 118, and is configured to receive the socket extension 310 in a generally vertical orientation. In other embodiments, the tool connector assembly 170 may be located, for instance, on a sidewall 116, such as to position the socket extension 310 horizontally and facing a fluid entrance opening 114 arranged laterally, as described heretofore.

The tool connector assembly 170 may include a sleeve 172, configured to receive a shaft 312 of the socket extension 310 (or an elongated portion of another tool) therethrough. In preferred embodiments, such as the present embodiment, the sleeve 172 forms an integral part of the main body 110. In other embodiments, the sleeve 172 may be attachable, either permanently or non-permanently, to the main body 110. An elongated, through bore 174 may extend through the sleeve 172, and further through the bottom wall 118, and may be defined by inner walls 178 of the sleeve 172 and/or bottom wall 118. An inner end 176 of the bore 174 may be located at or facing the interior space 112. One or more reinforcement ribs or members 180 may extend between the sleeve 172 and adjacent portions of the main body 110, such as between the sleeve 172 and the bottom wall 118 and/or between the sleeve 172 and the bottom wall 132 of the chute 130, as shown for instance in FIG. 3. As further shown in the figure, reinforcement ribs or members 182 may extend between the bottom wall portions 156 and the bottom wall 118 and/or between the bottom wall portions 156 and the bottom wall 132 of the chute 130.

As further shown in FIGS. 3 and 4, the connector assembly 170 may further include a tool retainer 190. The tool retainer 190 may have a generally annular body 192 defining a central opening 194, and a plurality of teeth or fingers 196 extending radially inward from the annular body 192 into the central opening 194. At least the fingers 196, and in some embodiments, the entire tool retainer 190, may be elastically deformable. For instance, the tool retainer 190 may be manufactured into a single-piece unit by plastic injection molding. The tool retainer 190 is configured to fit over and onto the socket extension 310 and prevent the socket extension 310 from sliding out of the tool connector assembly 170, as will be described in greater detail hereinafter. In some embodiments, the fingers 196 may elastically abut against the socket extension 310, such as against the shaft 312, to frictionally secure the tool retainer 190 along and relative to shaft 312. Preferably, said frictional attachment is configured such that the weight of the socket extension 310 and elements attached thereto, as will be described hereinafter, do not overcome the friction between the fingers 196 and the shaft 312, and yet such that a user may manually overcome said friction and may reposition the tool retainer 190 along the shaft 312.

Figure 5:
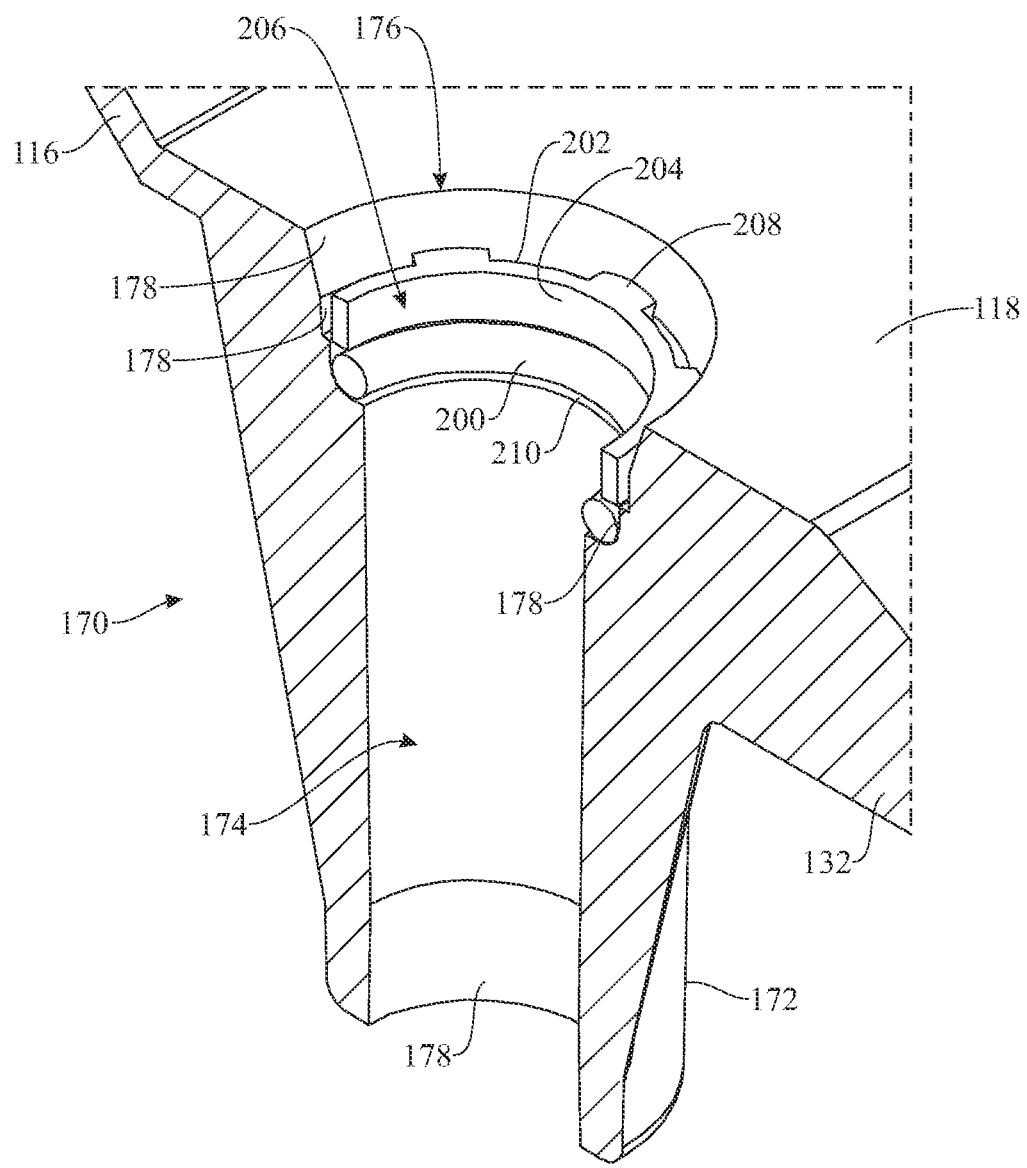
FIG. 5 presents an enlarged view of the area of the tool connector assembly of FIG. 4, showing a relative positioning between an elastic seal and an elastic seal retainer of the tool connector assembly.

As further shown, the connector assembly 170 may include at least one elastic seal 200 (e.g., an elastomeric O-ring seal, as shown), and an elastic seal retainer 202. As best shown in FIG. 5, the elastic seal 200 is configured to sealingly abut against an inner wall 178 of the tool connector assembly 170, said inner wall 178 facing and defining the bore 174, and further against the socket extension 310, thereby blocking any fluid from leaking from the interior space 112 through the bore 174, and thus fluid-tightly sealing the connector assembly 170. The elastic seal retainer 202 may retain the at least one seal 200 in place relative to the bore 174. For instance, the elastic seal retainer 202 may have a generally annular body 204 defining a central opening 206, and a plurality of teeth or fingers 208 extending radially outward from the annular body 204 into the central opening 206. At least the fingers 208, and in some embodiments, the entire elastic seal retainer 202, may be elastically deformable. For instance, the elastic seal retainer 202 may be manufactured into a single-piece unit by plastic injection molding: in another non-limiting example, the elastic seal retainer 202 may be manufactured of stamped metal. The fingers 208 of the elastic seal retainer 202 are configured to elastically abut against the inner wall 178 of the tool connector assembly 170 such that the elastic seal retainer 202 is non-axially-movable along the bore 174. The at least one elastic seal 200 may in turn interface with a protrusion or seat 210 formed in the inner wall 178 such that at least one elastic seal 200 is sandwiched between the seat 210 and the elastic seal retainer 202, and thereby prevented from axially moving along the bore 174. These sealing elements of the connector assembly 170, i.e. the elastic seal 200 and elastic seal retainer 202, are configured to allow a longitudinal and rotational movement of the socket extension 310 relative to the bore 174, while providing the sealing effect described heretofore.

Figure 6:
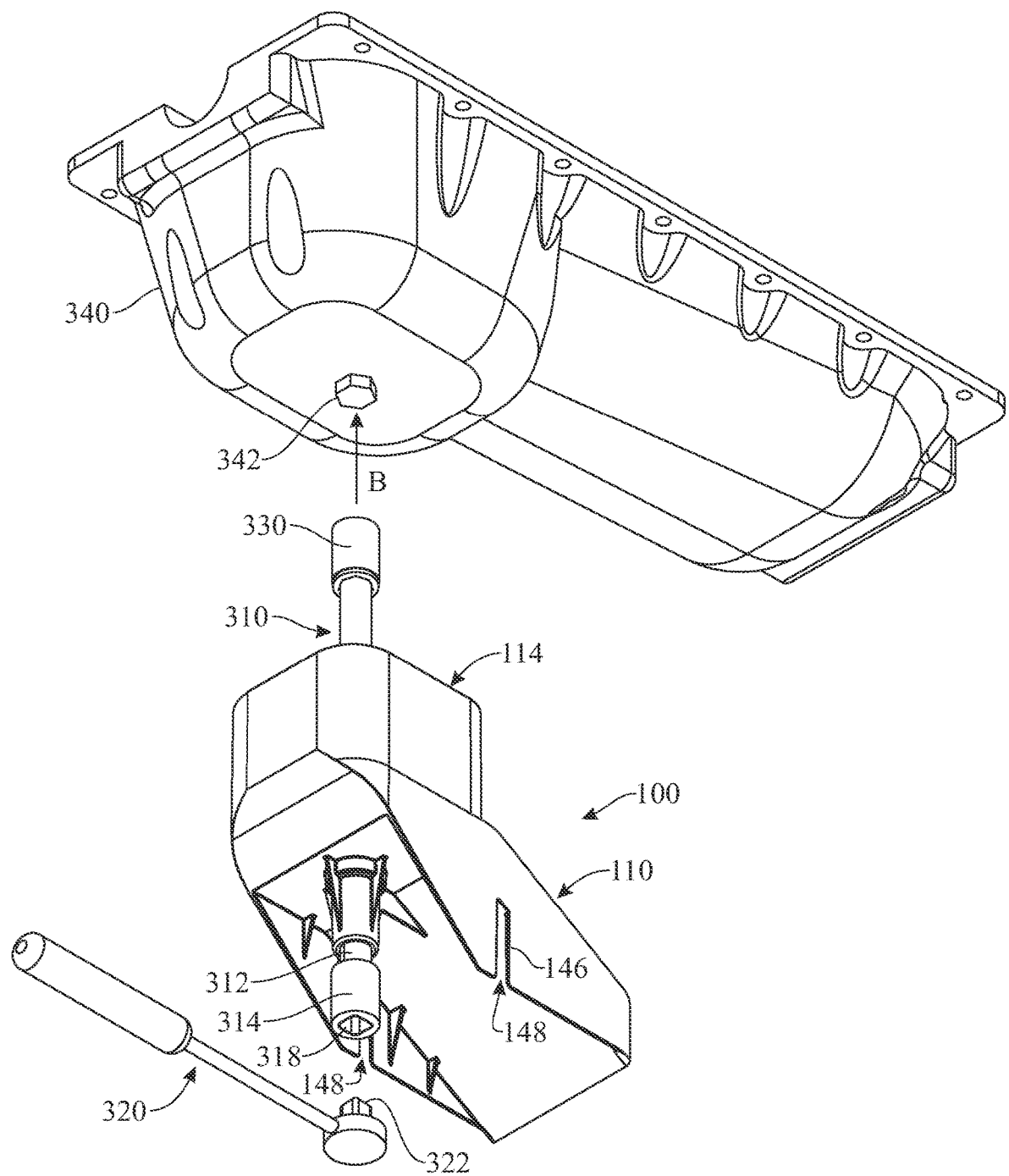
FIG. 6 presents a bottom, rear isometric view of the fluid draining system of FIG. 1 being connected to a drain plug of a fluid container prior to disconnecting the drain plug in order to proceed to drain fluid from the fluid container.
Figure 7:
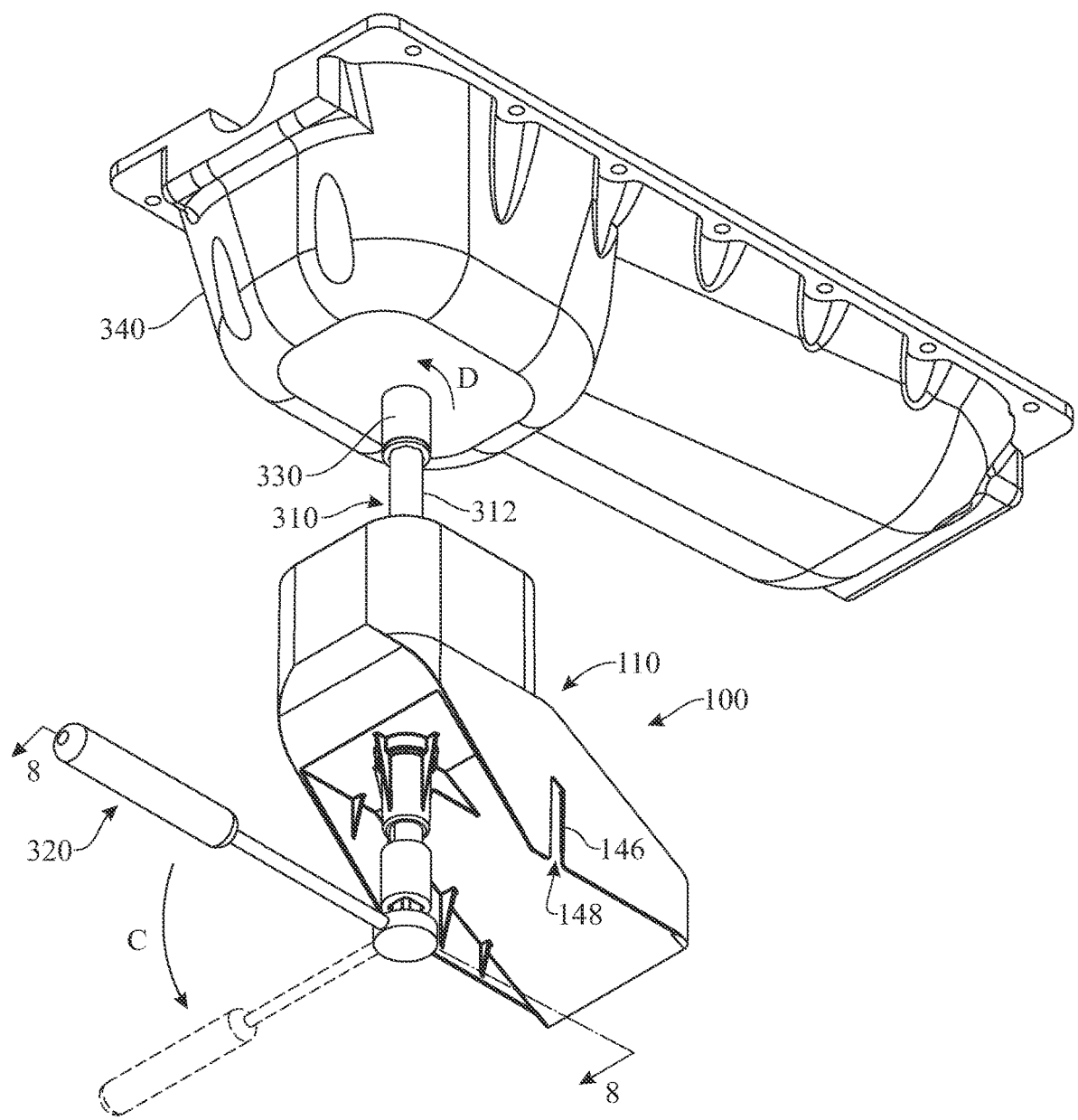
FIG. 7 presents a bottom, rear isometric view of the fluid draining system and fluid container of FIG. 6, showing operation of the ratchet wrench to unthread the drain plug to proceed to drain fluid from the fluid container.

As heretofore described, the fluid draining system 100 allows to cleanly drain fluid from a fluid container using an operating tool such as, but not limited to, socket extension 310. With reference to FIGS. 3 and 6, in addition to the shaft 312, the socket extension 310 may include a first connector 314 and a second connector 316, carried by the shaft 312 at opposite ends thereof. The first connector 314 may be configured to operatively couple with a torque-applying tool such as, but not limited to, a ratchet wrench 320 (FIG. 6). For example, the first connector 314 may include a ⅜" or other rectangular socket or bore 318 configured to non-rotationally couple with a corresponding ⅜" or other rectangular, drive plug or male head 322 of the ratchet wrench 320, shown in FIG. 6. It should be noted that these and other dimensions included herein are disclosed for illustrative purposes, and that alternative larger or smaller dimensions are contemplated without departing from the scope of the present disclosure. The second connector 316 may, in turn, be configured to operatively couple to a socket 330, which may include first and second bores 332 and 334 at opposite ends thereof. The first bore 332 may be configured to mate with the second connector 316 of the socket extension 310, such that the socket extension 310 provides a longitudinal extension arm allowing to position the socket 330 separated from the ratchet wrench 320 and yet capable of being subjected to a torque by the ratchet wrench 320.

An illustrative method of operation or use of the fluid draining system 100 will now be described with reference to FIGS. 6-10. In the illustrative method, the fluid draining system 100 is used to drain vehicle engine oil from a fluid container 340 specifically configured as a vehicle engine oil pan. With reference initially to FIG. 6, an operator may extend the socket extension 310 through the bore 174 of the tool connector assembly 170 such that the second connector 316 of socket extension 310 extends beyond the tool connector assembly 170, and optionally beyond the fluid entrance opening 114 of the main body 110, and the first connector 314 remains outside the tool connector assembly 170. The user may then fit the tool retainer 190 over and onto the shaft 312 of the socket extension 310, as shown for instance in FIG. 8. Alternatively, the main body 110 may come with the socket extension 310 and, optionally, the tool retainer 190 pre-installed on the main body 110. The user may then select a socket 330 which has a first bore 332 compatible with the second connector 316 of the socket extension 310, and a second bore 334 having a shape and size configured to mate with a drain plug 342 of the fluid container 340. The user may connect the selected socket 330 to the socket extension 310 by inserting the second connector 316 of the socket extension 310 into the first bore 332 of the socket 330. Next, the user may select to hook the main body 110 onto a fluid collection container 300 by fitting sidewall 302 of the fluid collection container 300 into the slots 146. The sidewall 302 may be generally planar or straight, as shown, or may present alternative configurations. The user may then position the main body 110 and fluid collection container 300 such that the socket 330 generally aligns with the drain plug 342, and may connect ratchet wrench 320 to the first connector 314 of the socket extension 310 by inserting the head 322 of the ratchet wrench 320 into the bore 318 of the first connector 314 of the socket extension 310. The non-rotational connection between the ratchet wrench head 322 and the first connector 314, and between the second connector 316 and the socket 330, allow a torque applied by the ratchet wrench 320 to be transmitted or transferred to the socket 330.

Figure 9:
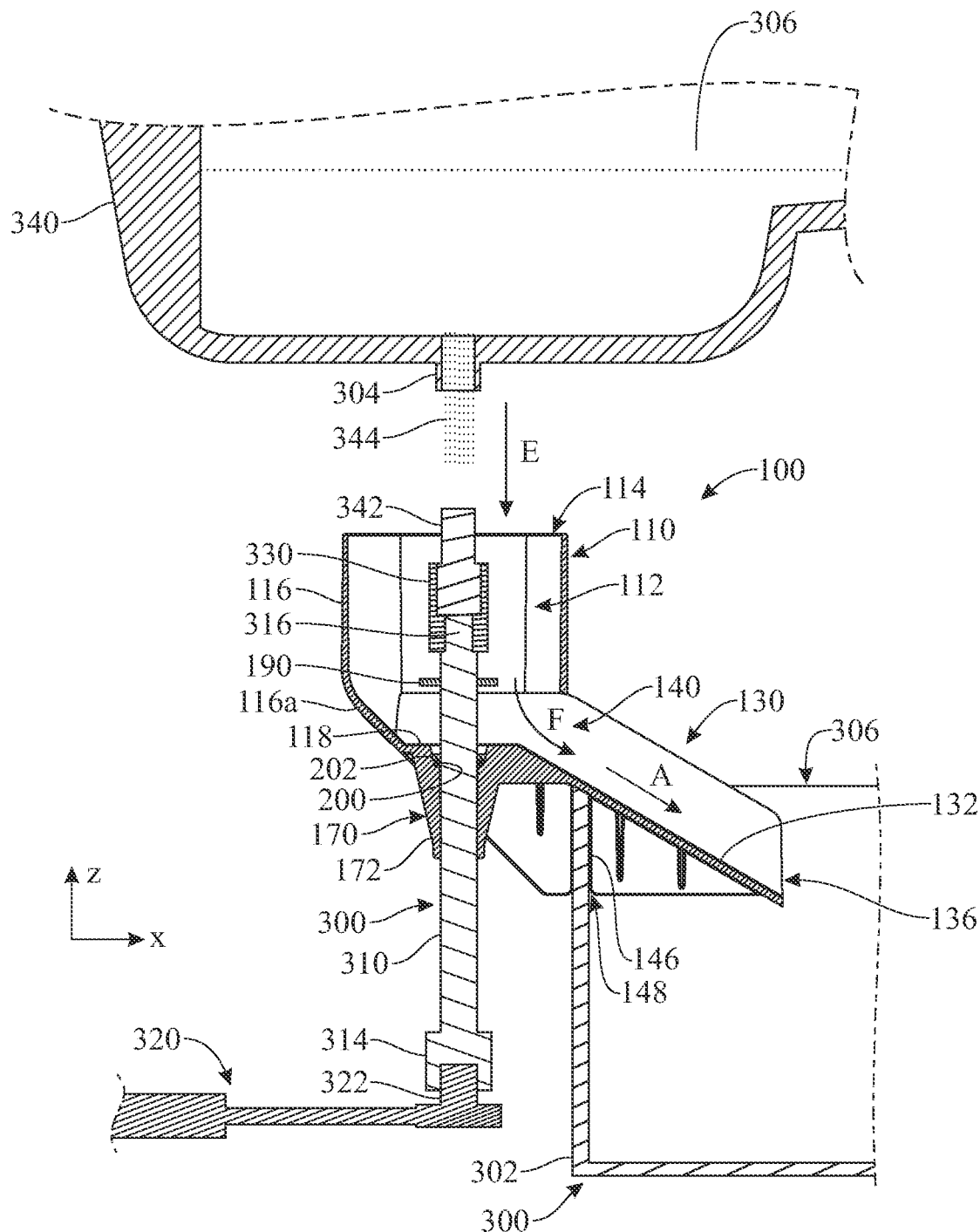
FIG. 9 presents a cross-sectional, side elevation view similar to FIG. 8, wherein the ratchet wrench, socket extension, socket and drain plug have been separated from the drain opening of the fluid container to allow fluid to begin draining from the fluid container.

Next, the user may advance the assembly formed by the ratchet wrench 320, socket extension 310 and socket 330 in the direction of arrow B to engage the socket 330 with the drain plug 342, while the main body 110 remains attached to the fluid collection container 300. In this engaged position, shown in FIGS. 7 and 8, the user may then operate the ratchet wrench 320, as indicated by arrow C, to responsively rotate the socket 330 via the socket extension 310, as indicated by arrow D. As described heretofore, the elastic seal 200 and elastic seal retainer 202 permit such rotational movement of the socket extension 310 while maintaining fluid-tightness. In turn, the elongated sleeve 172, particularly in embodiments in which the width or diameter of the bore 174 is generally the same or similar to that of the shaft 312 of the socket extension 310, may prevent lateral swaying of the socket extension 310 during operation of the ratchet wrench 320 to rotate the socket 330. Continued rotation of the socket 330 from the initial engaged position of FIGS. 7 and 8 eventually causes the drain plug 342 to unthread from a threaded drain opening 304 of the fluid collection container 300, allowing fluid 344 to start draining out of the fluid container 340 through the drain opening 304, as shown in FIG. 9. In embodiments in which the main body 110 is at least partially or entirely transparent, the transparent main body 110 may enable the user to observe the removal and replacement of the drain plug 342. In some embodiments, the sidewalls 116 of the main body 110 may be shaped and sized to extend closer to, and optionally against, the underside of the fluid container 340, thereby reducing or preventing splashing during the draining process. For instance and without limitation, the sidewalls 116 may be extendable and retractable, or collapsible, such that the user may extend them closer to the underside of the fluid container 340. Alternatively or additionally, the user may raise the main body 110 (either directly or by raising the fluid collection container 300 which carries the main body 110) to bring the sidewalls 116 closer to the underside of the fluid container 340.

Referring to FIG. 9, as indicated by arrow E, drained fluid 344 falls into the main body 110 through the fluid entrance opening 114, which is arranged below the drain opening 304 of the fluid container 340. Drained fluid 344 then flows through the interior space 112, through the chute opening 140 (as indicated by arrow F), down along the chute 130 (as indicated by arrow A) and into the fluid collection container 300. As shown in FIG. 9 and further shown in FIG. 4, one or more of the sidewalls 116 of the main body 110 may include sloped or non-vertical portions 116a configured to direct the fluid towards the chute opening 140. During the draining process, the one or more elastic seals 200 advantageously maintain fluid-tightness of the bore 174 such that fluid is unable to leak out of the main body 110 through the sleeve 172. In turn, in embodiments in which friction between the elastic seal 200 and the socket extension 310 is not sufficient to counteract the weight of the socket extension 310 and elements carried thereby, and a tool retainer 190 is present, the tool retainer 190 may prevent the socket extension 310 from slipping out of the main body 110 through the tool connector assembly 170 in the event that the socket extension 310 falls or descends. During the draining process, by having the main body 110 secured to and supported by the fluid collection container 300, the user may disconnect the ratchet wrench 320 and leave the fluid collection container 300 unattended during the completion of the draining process. In embodiments in which the main body 110 is at least partially or entirely transparent, the transparent main body 110 may allow the user to control the volume and velocity of the fluid 344 as it drains from the drain opening 304 of the fluid container 340, such as by adjustably threading the drain plug 342 into or out of the drain opening 304.

Once the draining process is finished, the user may reconnect the drain plug 342 to the threaded drain opening 304 by advancing the ratchet wrench 320, socket extension 310, socket 330 and drain plug 342 towards the drain opening 304 and operating the ratchet wrench 320 to thread the drain plug 342 into the drain opening 304. Next, the user may choose to disconnect the main body 110 from the fluid collection container 300 and disconnect the socket extension 310 from each other for storage or other purposes. Alternatively, the user may choose to keep the main body 110 attached to the fluid collection container 300 and/or the socket extension 310 connected to the main body 110, and preferably both, such that the invention is readily available for use to drain a subsequent fluid container.

In summary, a fluid draining system is disclosed which may provide, in different embodiments of the invention, a variety of advantages. Firstly, the invention is easy to operate and readily usable, as it can be used with readily available tools such as, but not limited to, a conventional ratchet wrench or driver, and a conventional socket. Secondly, the invention securely directs waste fluid into the fluid collection container, avoiding spillage. In addition, the invention allows for quick removal of the drain plug closing the drain opening of the fluid container, while protecting the user from the rush of fluid upon removal of the drain plug: such protection increases cleanliness of the procedure, and contributes to increase safety of the user and the surroundings, particularly when draining a hazardous or contaminating fluid. In embodiments in which the main body is provided with one or more mounting slots, the device may be mounted on an edge of an elevated fluid collection container or other structure proximate the fluid collection container, and the user may leave the device unattended during the completion of the draining process. The invention may also allow the user to remove the drain plug using one hand only, such as if the main body of the fluid draining system is secured to the fluid container, fluid collection container, or other structure. Furthermore, in embodiments provided with one or more magnets, the invention may be stabilized against or on a ferromagnetic fluid container, enabling the mechanic to leave the fluid draining fluid assembly unattended during the completion of the draining process. In addition, during draining, the drain plug may be retained by the invention, such as within the socket, facilitating reconnecting the drain plug to the fluid container once the fluid has been drained from the fluid container. Additionally, different embodiments of the invention may be configured to operate fluid container drain plugs arranged on different sides of the fluid container, such as, but not limited to, a bottom wall or a side wall of the fluid container. In embodiments in which the main body is at least partially transparent, and preferably substantially entirely transparent, the user may observe the fluid being drained through the main body, and may control the quantity and velocity of the oil being drained, such as by adjusting the position of the drain plug relative to the drain opening to vary the effective opening size and thus the amount of fluid being drained.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A fluid draining system, comprising:
a main body comprising one or more walls enclosing an interior space, a fluid entrance opening communicated with the interior space, and a chute extending from and in fluid communication with the interior space, the chute oriented to direct fluid flow out of the main body to an open end of the chute by gravity, the main body further comprising one or more slots, wherein each slot of the one or more slots is elongately formed and straight and comprises a respective bottom, open end; and
a tool connector assembly carried by the main body, the tool connector assembly comprising:
a sleeve, elongately formed along a first direction,
a bore, elongately formed through the sleeve and through the main body along the first direction, the bore comprising a first end located at the interior space of the main body and an opposite, second end at an outside of the main body,
at least one elastic seal mounted at the bore and configured to elastically seal against an elongated element extending through the bore and to block fluid communication between the first end and the second end of the bore, and an elastic seal retainer, blocking a movement of the elastic seal relative to the bore along the first direction; wherein the fluid draining system is configured to adopt a working configuration in which the main body is mounted on and stabilized with respect to a fluid collection container by a generally planar wall structure of the fluid collection container being received within the one or more slots of the main body through the respective bottom open end of each slot of the one or more slots, with the one or more slots extending upward such that gravity maintains the fluid draining system mounted on said generally planar wall structure, and further in which the open end of the chute is arranged within an interior space of the fluid collection container permitting the delivery of said fluid flow into the interior space of the fluid collection container, and the second end of the bore of the tool connector assembly is arranged outside the interior space of the fluid collection container; and further wherein the one or more slots are arranged between the open end of the chute and the tool connector assembly when the main body is observed in side elevation view.

2. The fluid draining system of claim 1, wherein the main body is formed into a single-piece unit.

3. The fluid draining system of claim 2, wherein the sleeve is integrally-formed with the main body into said single-piece unit.

4. The fluid draining system of claim 1, wherein the main body is at least partially transparent such that an observer at the second end of the bore may view an area adjacent to the fluid entrance opening of the main body through the main body.

5. The fluid draining system of claim 1, wherein the first end of the bore is arranged at a bottom wall of the one or more walls of the main body, the bottom wall arranged facing and below the interior space of the main body.

6. The fluid draining system of claim 1, wherein the chute is located at a bottom area of the one or more walls of the main body.

7. The fluid draining system of claim 6, wherein the chute includes a bottom wall providing a top surface for fluid to flow thereon along the chute, wherein the chute is oriented laterally relative to a vertical, top-to-bottom direction of the main body, and further wherein the top surface of the bottom wall of the chute is sloped downward.

8. The fluid draining system of claim 7, wherein the chute is communicated with the interior space through a chute opening formed in the main body.

9. The fluid draining system of claim 8, wherein the chute opening is formed between a portion of the one or more walls located above the chute opening and the bottom wall of the main body.

10. The fluid draining system of claim 6, wherein the fluid entrance opening is located at a top area of the main body and oriented upward.

11. The fluid draining system of claim 6, wherein the first direction is parallel to a vertical, top-to-bottom direction of the main body.

12. The fluid draining system of claim 1, wherein the elastic seal retainer includes an annular body configured to elastically abut against an inner wall facing the bore to retain the elastic seal retainer in place relative to the inner wall and the bore.

13. The fluid draining system of claim 12, wherein the annular body of the elastic seal retainer comprises a plurality of radially outwardly extending fingers, wherein the radially outwardly extending fingers are elastically deformable and configured to elastically abut against the inner wall to retain the elastic seal retainer in place relative to the inner wall and the bore.

14. The fluid draining system of claim 1, further comprising a tool retainer, the tool retainer comprising an annular body mountable about and frictionally securable to said elongated element receivable through the bore to at least partially block a longitudinal movement of said elongated element through said bore.

15. The fluid draining system of claim 14, wherein the annular body of the tool retainer includes a plurality of radially inwardly extending fingers, wherein the radially inwardly extending fingers are elastically deformable and configured to elastically adjust against the elongated element receivable through the bore.

16. The fluid draining system of claim 1, further comprising a socket extension mountable through the bore of the tool connector assembly, with a first end of the socket extension arranged outside the main body and an opposite, second end of the socket extension arranged at or near the fluid entrance opening of the main body, wherein a shaft of the socket extension and the at least one elastic seal are shaped and sized relative to one another such that the at least one elastic seal elastically abuts against the shaft of the socket extension blocking fluid communication between the first end and the second end of the bore, while enabling the socket extension to rotate and axially move relative to the bore and the main body.

17. The fluid draining system of claim 1, wherein the one or more slots comprise two slots arranged in spaced-apart and parallel relationship with one another and aligned with one another along a transverse direction perpendicular to each slot of the one or more slots.

18. A fluid draining system, comprising:
a main body integrally formed into a single-piece unit, the main body comprising one or more walls enclosing an interior space, a fluid entrance opening communicated with the interior space, and a chute extending from and in fluid communication with the interior space, the chute oriented to direct fluid flow out of the main body to an open end of the chute by gravity, the main body further comprising one or more slots, wherein each slot of the one or more slots is elongately formed and straight and comprises a respective bottom, open end;
a tool connector assembly carried by the main body, the tool connector assembly comprising:
a sleeve, elongately formed along a first direction,
a bore, elongately formed through the sleeve and through the main body along the first direction, the bore comprising a first end located at the interior space of the main body and an opposite, second end at an outside of the main body,
at least one elastic seal mounted at the bore and configured to elastically seal against an elongated element extending through the bore and to block fluid communication between the first end and the second end of the bore, and
an elastic seal retainer, comprising an annular body configured to elastically abut against an inner wall facing the bore to retain the elastic seal retainer in place relative to the inner wall and thereby block a movement of the elastic seal relative to the bore along the first direction; and
a tool retainer, the tool retainer comprising an annular body mountable about and frictionally securable to said elongated element receivable through the bore to at least partially block a longitudinal movement of said elongated element through said bore; wherein the fluid draining system is configured to adopt a working configuration in which the main body is mounted on and stabilized with respect to a fluid collection container by a generally planar wall structure of the fluid collection container being received within the one or more slots of the main body through the respective bottom open end of each slot of the one or more slots, with the one or more slots extending upward such that gravity maintains the fluid draining system mounted on said generally planar wall structure, and further in which the open end of the chute is arranged within an interior space of the fluid collection container permitting the delivery of said fluid flow into the interior space of the fluid collection container, and the second end of the bore of the tool connector assembly is arranged outside the interior space of the fluid collection container; and further wherein the one or more slots are arranged between the open end of the chute and the tool connector assembly when the main body is observed in side elevation view.

19. A fluid draining system, comprising:

a main body integrally formed into a single-piece unit, the main body comprising one or more walls enclosing an interior space, a fluid entrance opening communicated with the interior space, and a chute extending from and in fluid communication with the interior space, the chute oriented to direct fluid flow out of the main body to an open end of the chute by gravity, the main body further comprising one or more slots, wherein each slot of the one or more slots is elongately formed and straight and comprises a respective bottom, open end;

a tool connector assembly carried by the main body, the tool connector assembly comprising:
- a sleeve, elongately formed along a first direction and integrally formed with the main body into said single-piece unit,
- a bore, elongately formed through the sleeve and through the main body along the first direction, the bore comprising a first end located at the interior space of the main body and an opposite, second end at an outside of the main body,
- at least one elastic seal mounted at the bore and configured to elastically seal against an elongated element extending through the bore and to block fluid communication between the first end and the second end of the bore, and
- an elastic seal retainer, comprising an annular body configured to elastically abut against an inner wall facing the bore to retain the elastic seal retainer in place relative to the inner wall and thereby block a movement of the elastic seal relative to the bore along the first direction; and a tool retainer, the tool retainer comprising an annular body mountable about and frictionally securable to said elongated element receivable through the bore to at least partially block a longitudinal movement of said elongated element through said bore; wherein the fluid draining system is configured to adopt a working configuration in which the main body is mounted on and stabilized with respect to a fluid collection container by a generally planar wall structure of the fluid collection container being received within the one or more slots of the main body through the respective bottom open end of each slot of the one or more slots, with the one or more slots extending upward such that gravity maintains the fluid draining system mounted on said generally planar wall structure, and further in which the open end of the chute is arranged within an interior space of the fluid collection container permitting the delivery of said fluid flow into the interior space of the fluid collection container, and the second end of the bore of the tool connector assembly is arranged outside the interior space of the fluid collection container; and further wherein the one or more slots are arranged between the open end of the chute and the tool connector assembly when the main body is observed in side elevation view.

\* \* \* \* \*